Nov. 30, 1965 W. D. GREENFIELD 3,220,138
HOOK SETTER
Filed June 12, 1964

INVENTOR.
WILLIAM D. GREENFIELD
BY *Victor J. Evans & Co.*
ATTORNEYS 3,220,138
HOOK SETTER
William D. Greenfield, Rte. 3, Box 1836,
Auburn, Wash.
Filed June 12, 1964, Ser. No. 374,606
3 Claims. (Cl. 43—15)

This invention relates to an improved hook setter, and more particularly to a spring actuated device for securely setting a hook in the mouth of a fish that has attempted to take the bait or lure, thereby eliminating the possibility of losing the fish due to slow reflex action of the fisherman or resulting from slackness in the fishing line.

One of the objects of this invention is to provide a compact device which can be easily attached to the end of a fishing line adjacent the point where means is provided for attachment of a hook. One of the advantages of this invention resides in the fact that little or no effort is required on the part of the fisherman to securely hook a fish that has attempted to take the bait.

Another object of the invention is to provide a hook setter which, after a fish is securely hooked, will serve as a means for absorbing shock in the line caused by the caught fish trying to jerk free of the engaged hook.

A principal object of the invention is accomplished by the use of two springs mounted within the hook setter, one of said springs providing the flexibility necessary in the functioning of a shock absorber.

With these and other features and objects in view, a full understanding of the invention will be had from the following description taken in connection with the accompanying drawings wherein.

Referring now to the drawings in detail, corresponding and like parts are indicated by like reference characters in all the views.

Figure 1:
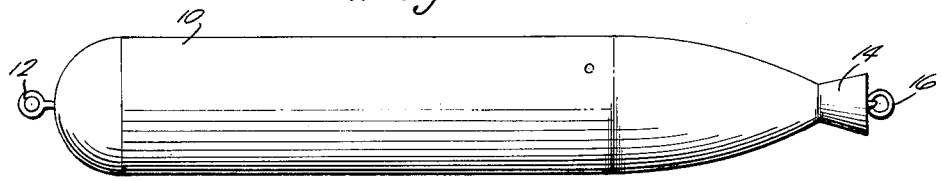
FIGURE 1 is a side elevational view of the device showing rings at both ends thereof for attachment of a fishing line and hook.
Figure 2:
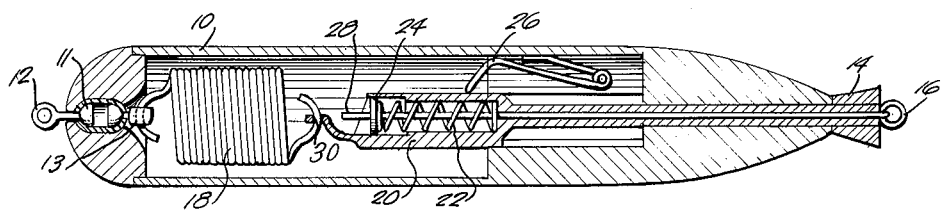
FIGURE 2 is a longitudinal cross-sectional view showing the hook setter in the unloaded position.
Figure 3:
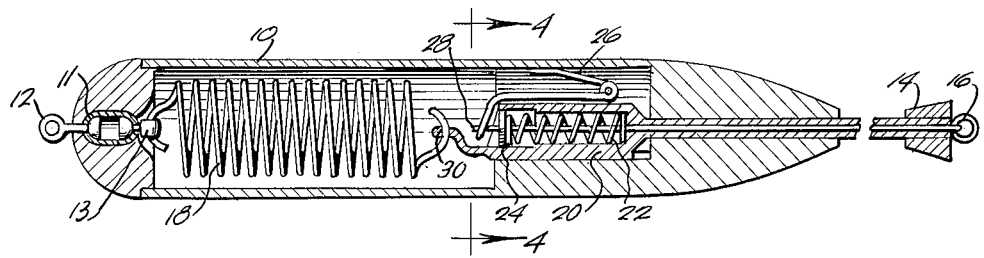
FIGURE 3 is a longitudinal cross-sectional view showing the hook setter in the loaded position.
Figure 4:
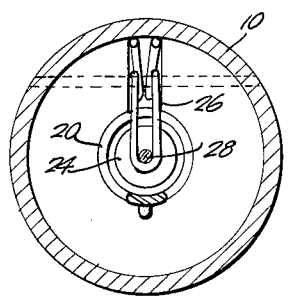
FIGURE 4 is a cross-sectional view taken along lines 4—4 of FIGURE 3, showing a further feature of the invention.

As seen in FIGS. 1, 2 and 3, the device hereof comprises an elongated tubular body 10 having ring member 12 pivotally mounted at the front portion thereof, and a second ring member 16 rigidly mounted on the end of shaft 28 adjacent handle 14, said ring members being adapted for attachment of a fishing line (not shown) and fish hook (not shown), respectively.

Oval shaped ring 11 connects ring 12 and swivel member 13 which in turn securely holds one end of metal spring 18, and ring 11 is shown securely mounted within the body 10.

Metal tubing 20 is slidably mounted in the body 10, as shown in FIGS. 2 and 3. Handle member 14 is mounted on the end of tubing 20 adjacent ring member 16. Slidably mounted in metal tubing 20 is shaft 28 having collar 24 and spring 22 mounted thereon. Metal tubing 20 is adapted to securely hold the rearward end of spring 18; as shown at 30.

Spring loop 26 is pivotally mounted adjacent to and above metal tubing 20 at the point wherein spring 22 is mounted.

The operation of the device may be understood more clearly by reference particularly to FIGS. 2 and 3, wherein the main spring 18 of the hook setter is seen in the unloaded and loaded positions, respectively. In order to load the hook setter, the body member 10 is held securely in one hand while the handle 14 is grasped by the thumb and forefinger of the other hand and pulled out to the position shown in FIG. 3. When metal tube 20 and shaft 28 slide under and pass loop 26, spring 18 expands and is releasably engaged in the loaded position by loop 26 which has fallen over the end of shaft 28 holding the tube and shaft assembly as shown in FIG. 3.

After the hook setter is loaded as described above, it is ready for use on a fishing line. When a fish strikes a baited hook which is attached to ring 16, the consequent pressure on the shaft and tube assembly releases spring loop 26, thus allowing the spring 18 to contract with a quick jerk. This quick contraction of spring 18 causes tube 20 and the attached hook to be jerked forward thus setting and engaging the hook securely in the mouth of the fish.

Once the fish is securely hooked, spring 22, in connection with shaft 28 and collar 24, acts as a shock absorber thus eliminating breakage in the line due to any quick jerking movement by the fish.

It should be understood that the specific apparatus herein illustrated and described is intended to be representative only, as many changes may be made therein without departing from the clear teachings of the invention. Accordingly, reference should be made to the following claims in determining the full scope of the invention.

What is claimed is:

1. A hook setter comprising a tubular body having a bore extending the length thereof, said body and said bore having front and rear portions, means mounted on said front portion of said body for attachment of a fishing line, a spring mounted in said front portion of said bore and connected to said attachment means, a length of metal tubing slidably mounted in said rear portion of said bore, said tubing connected to said spring, a shaft slidably mounted in said tubing, a collar mounted adjacent a free end of said shaft adjacent to said spring, a second spring mounted within said tubing and encompassing said shaft at a portion thereof adjacent said collar, a spring actuated loop pivotally mounted in an outer portion of said body adjacent to said second spring for releaseably encompassing the free end of said shaft adjacent said collar.

2. A hook setter comprising a tubular body having a generally cylindrical bore extending throughout the length thereof, said body and said bore having front and rear portions, line connecting means mounted on the front portion of the body for attachment of a fishing line, hook connecting means mounted on the rear portion of said body for attachment of a fishing hook, a spring mounted in said front portion of said bore and connected to said line connecting means, metal tubing slidably mounted in the rear portion of said bore, said metal tubing being connected to said spring, a shaft slidably mounted in said tubing and having a collar mounted adjacent a free end of said shaft in juxtaposition to said spring, a second spring mounted within said tubing and encompassing said shaft throughout a portion thereof adjacent said collar, spring actuated loop means mounted in an outer portion of said body adjacent said second spring, for thereby releasably engaging said shaft adjacent said collar.

3. A hook setter comprising a hollow body, a tube slidably mounted in one end of the body, a shaft mounted within the tube and having a collar adjacent one end thereof, spring means mounted within the tube and engaging said collar and encompassing said shaft, a second spring means located in the opposite end of the body and connected with the tube, and a further spring means pivotally mounted in the body and releasably encompassing said shaft.

References Cited by the Examiner
UNITED STATES PATENTS
| | | | |
|---|---|---|---|
| 1,183,527 | 5/1916 | Blodgett | 43—35 |
| 2,530,007 | 11/1950 | Euzent | 43—15 |
| 2,906,051 | 9/1959 | O'Bryan | 43—35 |

FOREIGN PATENTS
| | | |
|---|---|---|
| 710,595 | 6/1931 | France. |
| 731,625 | 5/1932 | France. |
| 872,745 | 2/1942 | France. |
| 439,265 | 9/1948 | Italy. |

SAMUEL KOREN, *Primary Examiner.*